United States Patent [19]

Mercer et al.

[11] Patent Number: 5,849,824
[45] Date of Patent: Dec. 15, 1998

[54] GELS FROM ANHYDRIDE-CONTAINING POLYMERS

[75] Inventors: Frank Mercer, Belmont, Calif.; Hendrik Graulus, Herent, Belgium

[73] Assignee: Raychem Corporation, Menlo Park, Calif.

[21] Appl. No.: 595,894

[22] Filed: Feb. 6, 1996

Related U.S. Application Data

[63] Continuation-in-part of Ser. No. 535,848, Sep. 28, 1995, abandoned, which is a continuation-in-part of Ser. No. 379,859, Jan. 27, 1995, abandoned.

[51] Int. Cl.⁶ .................................. C08K 5/01; C08K 5/10
[52] U.S. Cl. .................... 524/297; 524/295; 524/296; 524/298; 524/474; 524/476; 524/481; 524/483; 524/491; 524/502; 524/504; 524/514; 524/517; 524/531; 524/534; 524/535; 524/549
[58] Field of Search .................................. 524/295, 296, 524/297, 298, 481, 483, 502, 504, 514, 517, 531, 535, 549, 474, 476, 491, 534

[56] References Cited

U.S. PATENT DOCUMENTS

| | | | |
|---|---|---|---|
| 3,020,260 | 2/1962 | Nelson | 260/46.5 |
| 3,929,715 | 12/1975 | Nowell et al. | 260/33.6 |
| 3,972,961 | 8/1976 | Hammer et al. | 260/857 G |
| 4,017,557 | 4/1977 | Hammer et al. | 260/857 G |
| 4,089,794 | 5/1978 | Engel et al. | 252/51.5 A |
| 4,093,098 | 6/1978 | Wszolek | 524/549 X |
| 4,152,312 | 5/1979 | Sackmann et al. | 524/549 |
| 4,163,645 | 8/1979 | Cheng et al. | 524/549 X |
| 4,200,561 | 4/1980 | Chang | 524/556 X |
| 4,369,284 | 1/1983 | Chen | 524/476 |
| 4,600,261 | 7/1986 | Debbaut | 339/116 |
| 4,613,646 | 9/1986 | Sandvick | 524/549 X |
| 4,634,207 | 1/1987 | Debbaut | 339/116 C |
| 4,680,233 | 7/1987 | Camin et al. | 325/424.6 |
| 4,716,183 | 12/1987 | Gamarra et al. | 522/80 |
| 4,721,832 | 1/1988 | Toy | 174/87 |
| 4,777,063 | 10/1988 | Dubrow et al. | 427/44 |
| 4,852,646 | 8/1989 | Dittmer et al. | 165/185 |
| 4,865,905 | 9/1989 | Uken | 428/220 |
| 4,942,270 | 7/1990 | Gamarra | 174/93 |
| 4,963,698 | 10/1990 | Chang et al. | 174/77 R |
| 4,985,506 | 1/1991 | Blum et al. | 525/298 |
| 4,993,966 | 2/1991 | Levy | 439/411 |
| 5,069,637 | 12/1991 | Baubles | 439/412 |
| 5,079,300 | 1/1992 | Dubrow et al. | 525/106 |
| 5,111,001 | 5/1992 | Jervis | 174/92 |
| 5,132,355 | 7/1992 | Nahlovsky | 524/474 |
| 5,139,440 | 8/1992 | Volk et al. | 439/413 |
| 5,140,746 | 8/1992 | Debbaut | 29/885 |
| 5,149,278 | 9/1992 | Waas et al. | 439/412 |
| 5,167,848 | 12/1992 | Chung et al. | 525/300 X |
| 5,173,060 | 12/1992 | Shimirak et al. | 439/416 |
| 5,177,143 | 1/1993 | Chang et al. | 524/848 |
| 5,273,671 | 12/1993 | Patil et al. | 525/375 X |
| 5,294,681 | 3/1994 | Krupey | 525/327.6 |
| 5,313,019 | 5/1994 | Brusselmans et al. | 174/93 |
| 5,313,702 | 5/1994 | Fischer, Jr. et al. | 29/883 |
| 5,357,057 | 10/1994 | Debbaut | 174/84 R |
| 5,360,350 | 11/1994 | Koblitz et al. | 439/726 |
| 5,412,022 | 5/1995 | Andres et al. | 524/548 X |

FOREIGN PATENT DOCUMENTS

| | | |
|---|---|---|
| 0 002 286 A3 | 6/1979 | European Pat. Off. . |
| 0 295 881 A3 | 12/1988 | European Pat. Off. . |
| 0 555 184 A1 | 8/1993 | European Pat. Off. . |
| 2 698 631 | 6/1994 | France . |
| 2 237 214 | 2/1973 | Germany . |
| WO 93/07654 | 4/1994 | WIPO . |

OTHER PUBLICATIONS

Brochure "KRATON®Polymers For Adhesive Sealants", –Shell Chemical Co. SC: 2278–95 Jan. 1995.
Volksen et al., Poly. Mat. Sci. & Eng. 54, pp. 94–97 (1986).
Exxon Chemical, EXXELOR VA 1801 Product Description Oct. 1993.
UNIROYAL Chemical Co. Inc. "ROYALTUF"Product description.
Technical Report of Lotader Resins B–100 Oct. 1989.
Derwent abstract WPI–10071U/08.
Derwent abstract WPI 94–200511/24.
Derwent abstract WPI 93–251427/32.

*Primary Examiner*—Judy M. Reddick
*Attorney, Agent, or Firm*—Yuan Chao; Herbert G. Burkard

[57] ABSTRACT

The invention provides for a thermoset or thermoplastic gel composition containing a polymer with anhydride groups along the polymer backbone at least at outset of the fabrication process and an extender fluid, optionally including thermally conductive fillers. The gel compositions are useful for sealing wires, vibration dampening, sporting goods, and toys.

10 Claims, No Drawings

GELS FROM ANHYDRIDE-CONTAINING POLYMERS

CROSS-REFERENCE TO RELATED APPLICATIONS

This application is a continuation-in-part of application Ser. No. 08/535,848, filed Sep. 28, 1995, now abandoned which is a continuation-in-part of application Ser. No. 08/379,859, filed Jan. 27, 1995, now abandoned the disclosures of which are incorporated herein by reference.

TECHNICAL FIELD OF THE INVENTION

This invention relates to fluid-extended polymer gels fabricated from anhydride-containing polymers and an extending fluid.

BACKGROUND OF THE INVENTION

Fluid-extended polymer gels are substantially dilute systems which exhibit no steady state flow. As discussed in Ferry, "Viscoelastic Properties of Polymers,"3rd Ed., p. 529 (J. Wiley & Sons, New York 1980), a polymer gel is a solution cross-linked by chemical bonds, crystallites, or some other kind of junction. The absence of the steady state flow is the key definition of the solid-like properties, while the substantial dilution is necessary to give the relatively low modulus of gels. The solid nature is achieved by a continuous network structure formed in the material generally through crosslinking the polymer chains. The crosslinking can be either physical or chemical as long as the crosslink sites are sustained at the use conditions of the gel.

Examples are polyurethane systems as taught in U.S. Pat. No. 4,600,261 and 5,140,476 and silicone systems as taught in U.S. Pat. Nos. 4,634,207; 4,680,233; 4,777,063 and 5,079,300. The silicone gels may have a nonreactive extending fluid or a reactive extending fluid (e.g., a vinyl-rich silicone fluid), such as Sylgard® 527 (Dow-Corning) or those disclosed in U.S. Pat. No. 3,020,260. All the preceding patents are incorporated by reference.

Other gels may be based on styrene-ethylene butylene-styrene (SEBS) or styrene-ethylene propylene-styrene (SEPS) and like systems extended with an extender oil of naphthenic or nonaromatic or low aromatic content hydrocarbon oil. Suitable examples are U.S. Pat. Nos. 4,369,284; 4,716,183; and 4,942,270. Gels produced by mixing SEBS or SEPS and paraffinic oils comprise glassy styrenic microphases interconnected by a fluid-extended elastomeric phase. The microphase-separated styrenic domains serve as the junction points in the systems. Such gels are examples of thermoplastic systems. Conversely, silicone gels are thermoset gels, chemically cross-linked via a multifunctional cross linking agent.

Alternatively, ethylene-propylene-diene monomer (EPDM) rubber based systems as described in U.S. Pat. No. 5,177,143 (incorporated by reference) can be utilized but these systems tend to harden with age due to continued curing. Low cost effective systems based upon EPDM rubbers and the like with a higher operating temperature than of SEBS materials would be highly desirable, as they would not have the high cost associated with silicone gels or the potential toxicity associated the isocyanate precursors for polyurethane gels. It would also be desirable to be able to make both thermoplastic and thermoset gels from a single family of starting materials. Preferably, the base materials are comparable in cost to SEBS and are available commercially.

SUMMARY OF THE INVENTION

We have discovered a gel system which has the previously recited desirable features as well as many others obvious to the skilled artisan. The compositions of this invention can be thermoplastic or thermoset and comprise a gel fabricated from a polymer containing anhydride groups and an extending fluid, wherein the polymer is from about 3% to about 45% by weight of the gel (preferably 5 to 35 wt %) and the extending fluid is from about 97% to about 55% (preferably 95 to 65 wt %) by weight of the gel, based on the combined amounts of the polymer and the extending fluid. Mixtures of polymers can be used.

The system can optionally include additives such as stabilizers, antioxidants, corrosion inhibitors, flame retardants, fillers, thermally conductive fillers, electrically conductive fillers, colorants, biocides, tackifiers, etc. in an amount of from about 0% to about 65% by volume, based on the amount of gel plus additive. Exemplary additives include stabilizers and antioxidants such as hindered phenols (e.g., Irganox 1074 (Ciba)), phosphites (e.g., Weston DPDP (General Electric)), and sulfides (e.g., Cyanox LTDP (American Cyanamid)), light stabilizers (e.g., Cyasorb UV-531 (American Cyanamid)), and flame retardants such as halogenated paraffins (e.g., Bromoklor 50 (Ferro) and/or phosphorous containing organic compounds (e.g., Fyrol PCF and Phosflex 390 (both Akzo Nobel). Other suitable additives are described in "Additives For Plastics, Edition 1" published by D.A.T.A., Inc. and The International Plastics Selector, Inc., San Diego, Calif.

The materials can have a wide variety of hardnesses, as measured by a Voland texture analyzer, from about 2 to about 500 grams, with stress relaxations preferably less than about 85% and elongations greater than about 50% and preferably substantially greater than about 200–300%, most preferably greater than 500%. Tack is generally greater than about 2 grams, preferably greater than 5 grams. Hardness, tack and elongation are adjustable for specific applications. Preferred softer gels have hardnesses of from about 1 to 45 grams and preferred harder gels have hardnesses from about 45 to 200 grams. Preferred very hard gels have hardnesses from about 200 to about 500 grams. The elongation is measured according to ASTM D-638, using a type IV die, samples of thicknesses between ⅛ and ¼ inch, and a crosshead speed of 5 inch/min.

The Voland hardness, stress relaxation, and tack are measured using a Voland-Stevens texture analyzer model LFRA, Texture Technologies Texture Analyzer TA-XT2, or like machine, having a five kg load cell to measure force, a 5 g trigger, and ¼ inch (6.35 mm) stainless steel ball probe as described in U.S. Pat. No. 5,079,300, incorporated herein by reference. For example, for measuring the hardness of a gel a 60 mL glass vial containing about 20 grams of gel (or a stack of nine 2 inch×2 inch×⅛" thick slabs of gel) is placed in the TA-XT2 analyzer and the probe is forced into the gel at the speed of 0.2 mm/sec to a penetration distance of 4.0 mm. The Voland hardness of the gel is the force in grams required to force the probe at that speed to penetrate or deform the surface of the gel for 4.0 mm. Higher numbers signify harder gels. The data from the TA-XT2 analyzer is processed on an IBM PC or like computer, running Microsystems Ltd, XT.RA Dimension Version 2.3 software.

The tack and stress relaxation are read from the stress curve generated when the software automatically traces the force versus time curve experienced by the load cell when the penetration speed is 2.0 mm/sec and the probe is forced into the gel a penetration distance of about 4.0 mm. The probe is held at 4.0 mm penetration for 1 minute. The stress relaxation is the ratio of the initial force ($F_i$) resisting the probe at the pre-set penetration depth minus the force resisting the probe ($F_f$) after 1 min divided by $F_i$, expressed as a percentage. That is, percent stress relaxation is equal to $$\frac{(F_i - F_f)}{F_i} \times 100\%$$

where $F_i$ and $F_f$ are in grams. It is a measure of the ability of the gel to relax any induced compression placed thereon. The tack is the force in grams resisting on the probe as it is pulled out of the gel when the probe is withdrawn at a speed of 2.0 mm/sec from the preset penetration depth.

Alternatively, gels may be characterized by cone penetration according to ASTM D-217 as taught in U.S. Pat. Nos. 4,600,261; 4,634,207; 5,140,746; and U.S. Pat. No. 5,357,057, each incorporated by reference. Cone penetration ("CP") values range from about 70 ($10^{-1}$ mm) to about 400 ($10^{-1}$ mm). Harder gels generally have CP values from about 70 ($10^{-1}$ mm) to about 120 ($10^{-1}$ mm). Softer gels generally have CP values from about 200 ($10^{-1}$ mm) to 400 ($10^{-1}$ mm), with a particularly preferred range of from about 250 ($10^{-1}$ mm) to about 375 ($10^{-1}$ mm). For a particular materials family a relationship between CP and Voland gram hardness can be developed as taught in U.S. Pat. No. 4,852,646 (1989), incorporated by reference.

The instant compositions find use in vibration isolation, encapsulation, heat transfer (if suitably filled), and sealing of substrates, especially for repeated reentries, in electronics and telecommunication applications. Disclosures of re-enterable applications include U.S. Pat. Nos. 4,993,966; 5,313,702; 5,139,440; 5,149,278; 5,360,350; 5,357,057; 5,069,637; 5,111,001; 5,313,019; 5,173,060; 4,865,905; and WO 93/07654; all incorporated by reference. The materials also can be used for sealing nonre-enterable devices. In particular, the materials find use in terminal blocks, encapsulation of semiconductor substrates against vibration, toys, sporting goods, terminal block cap protectors, splice case seals, gel tapes, etc.

DESCRIPTION OF THE PREFERRED EMBODIMENTS

The gels are fabricated from anhydride-containing polymers and extending fluids, the polymer having been reacted with mono- or multifunctional amines. The gels can be divided into two groups, thermoset and thermoplastic. The gels preferably are based upon maleic anhydride-modified EPDM, maleic anhydride-modified ethylene-propylene copolymers, other maleic anhydride functionalized polymers, or combinations thereof. Maleic anhydride is preferred because of its availability and convenience but other anhydrides can be used. The maleic anhydride can be incorporated by any suitable method, several of which are described below.

Preferred anhydride-containing polymers have molecular weights between anhydride groups of from about 1,000 to about 500,000, more preferably from about 5,000 to about 250,000, and most preferably from about 10,000 to about 200,000. They have from about 0.01 wt % to about 10 wt %, more preferably about 0.1 wt % to about 8 wt %, and most preferably about 1 wt % to about 5 wt % anhydride groups.

A first method of making anhydride containing polymers is the reaction between maleic anhydride and a mixture of unsaturated monomers, among which are alkylenes such as ethylene, and substituted ethylenes, such as propylene, aromatics such as styrene, acrylates, methacrylates, and alkyl vinyl ethers, etc., as illustrated below with ethylene and methyl acrylate:

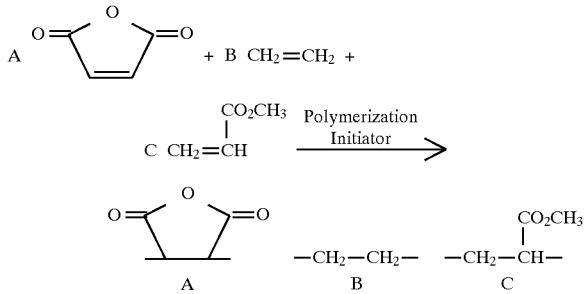

The maleic anhydride copolymer has repeat units A, B, and C, wherein typically repeat units B and C each independently comprise between 10 and 95 mole % of the total number of repeat units and repeat unit A typically comprises between 0.1 and 10 mole %.

Suitable anhydride-containing polymers made by this method include copolymers of maleic anhydride and one or more of the following alkylene and/or aromatic comonomers: ethylene, propylene, styrene, butene, butadiene, isobutylene, isoprene, 4-methyl-1-pentene, 1-pentene, 1-hexene, acrylonitrile, linear or branched $C_1$ to $C_{10}$ alkyl vinyl ethers, or linear or branched $C_1$ to $C_{10}$ alkyl-substituted acrylate or methacrylates. Especially preferred ones include ethylene-methyl acrylate-maleic anhydride copolymer, ethylene-ethyl acrylate-maleic anhydride copolymer, ethylene-butyl acrylate-maleic anhydride copolymer, ethylene-methyl methacrylate-maleic anhydride copolymer, ethylene-ethyl methacrylate-maleic anhydride copolymer, and ethylene-butyl methacrylate-maleic anhydride copolymer.

In a second method, an anhydride such as maleic anhydride is attached to a polymer backbone chain by reaction in the presence of an organic peroxide or other suitable reactant (s), as illustrated below. The polymer onto which the graft is formed may be a poly-alkylene, preferably an ethylene copolymer, more preferably an ethylene propylene rubber.

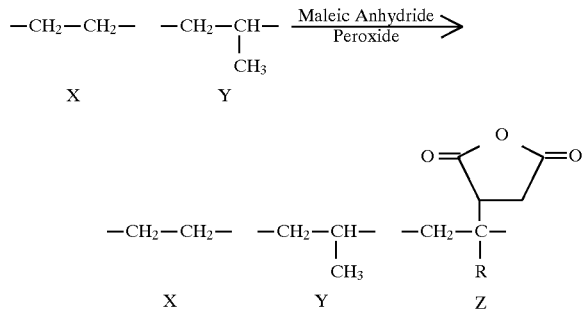

The ethylene-propylene rubber has ethylene repeat units X and propylene repeat units Y, where the propylene repeat units typically constitute between 10 and 95 mole % of the combined repeat units X and Y. In the grafting reaction, between 0.1 and 10 mole % of the repeat units are grafted with maleic anhydride to produce grafted repeat units Z (where R is H or $CH_3$).

An alternative method of grafting maleic anhydride to a polymer main chain utilizes the "ene" reaction of a polymer containing vinyl unsaturation (such as EPDM) with maleic anhydride at elevated temperature (100°–200° C.), as depicted below:

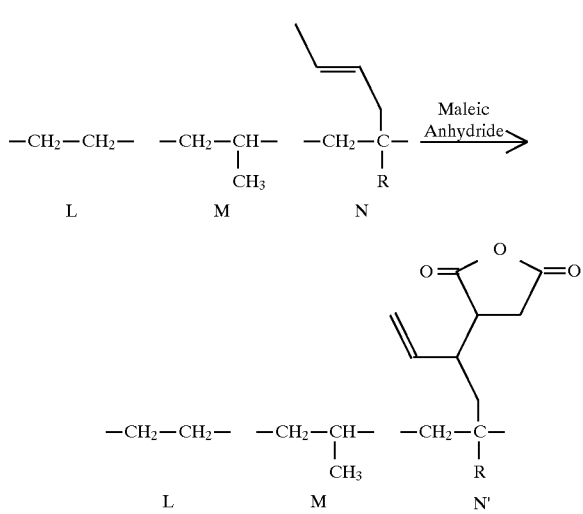

The EPDM is characterized by repeat units L, M, and N, with repeat units L and M each independently comprising between 10 and 95 mole % and repeat unit N between 0.1 and 10 mole %, of the combined total of repeat units L, M, and N. R is as previously defined. As a result of the ene reaction, repeat units N are functionalized with a pendant anhydride group to give modified repeat units N'.

Polymers from which anhydride-containing copolymers can be prepared by grafting maleic or other suitable anhydride via the peroxide initiated reaction or the ene reaction include polymers prepared from one or more aromatic or alkylene monomers such as ethylene, propylene, styrene, butene, butadiene, isobutylene, isoprene, acrylonitrile, 1-pentene, 1-hexene, 4-methyl-1-pentene, 1,4-hexadiene 1,3-pentadiene, dicyclopentadiene, 2-methylene-5-norbomene, linear or branched $C_1$ to $C_{10}$ alkyl vinyl ethers, or linear or branched $C_1$ to $C_{10}$ alkyl-substituted acrylates or methacrylates, or combinations thereof. Preferred anhydride-containing polymers are maleic anhydride-modified EPDM (MA-EPDM), maleic anhydride-modified-ethylene propylene copolymer (MA-EP), maleic anhydride-modified-styrene butadiene rubber (MA-SBR), and maleic anhydride-modified-acrylonitrile butadiene rubber (MA-ABN), or combinations thereof.

EPDM is a particularly preferred building block because of its low cost, resistance to oxidation, good weathering characteristics, ability to accept high levels of fillers and extending oils, and ease of functionalization with maleic anhydride. MA-EPDM is sold by Uniroyal under the tradename Royaltuf, with the grade Royaltuf 465 having an ethylene content of about 55 wt % and a maleic anhydride content of about 1 wt %. An alternative to MA-EPDM is MA-EP, available under the tradename Exxelor from Exxon Chemical.

Suitable extending fluids for both thermoset and thermoplastic gels include: hydrocarbon mineral oils (such as paraffinic or naphthenic oils), synthetic hydrocarbon oils (such as polybutene or polypropylene oils), liquid EPDM (such as Trilene hydrocarbons from Uniroyal), liquid polybutadiene (such as Ken Seika GI-3000), or poly(alpha-olefins) (such as Ethylflo 6 or Durasyn 174 from Albemarle, or Gulftene alpha olefins from Chevron Chemical Company), liquid esters (such as dioctyl phthalate or NONDTM), mixtures thereof, and the like. The molecular weights of the extending oils preferably are from about 100 to about 10,000, more preferably 150 to 5,000, and most preferably 250 to about 1,000. Preferred extending fluids include mineral oil, poly(alpha-olefins), linear or branched $C_1$ to $C_{18}$ dialkyl esters of phthalic, isophthalic, or terephthalic acid, and linear or branched $C_1$ to $C_8$ trialkyl esters of trimellitic acid.

Thermally conductive fillers can be added to improve the thermal conductivity of the gel composition. In electrical devices it is important to dissipate heat from circuit boards and components by conducting heat to a heat sink such as a metal plate or a cooling element. Thermally conductive fillers can be any particulate material which is compatible with the gel composition and has a thermal conductivity greater than 1 Watt per (meter·degree Kelvin) (W/m-°K). Examples include aluminum oxide, magnesium oxide, silicon carbide, zinc oxide, aluminum nitride, beryllium oxide, aluminum, copper, titanium dioxide, boron, boron nitride, barium titanate, iron oxide, tin oxide, calcium carbonate, calcium oxide, mixtures thereof, and the like. Particle sizes may vary and particle shape may be round, irregular, flake, platelet, cubic, hexagonal or other shape. Even short fibers or needles or whiskers can be used if the length and stiffness do not interfere with the conformability of the composition to the shape of the surface on which it is used for heat transfer. Additional suitable fillers are disclosed in U.S. Pat. No. 4,852,646, incorporated by reference.

The particulate filler preferably constitutes from 0 up to about 65, more preferably 25 to 65, and most preferably 50 to 65 volume %. The greater the volume percent filler, the higher the thermal conductivity. Thus, higher loadings are preferred provided the desired conformal gel properties are not compromised. The softness and conformability of the gel permits the conduction of heat away from a source without the need for having high compression force between bodies to assist heat transfer. Slight compression, e.g. greater than 0.05 psi externally applied pressure or the force exerted by the bodies resting one upon the other, is sufficient to effect efficient heat transfer. Higher pressures (1 psi or more) ensure better heat transfer and sealing. In addition, the resilient nature of the gels provides vibration dampening as well as sealing between the two bodies. Those skilled in the art will appreciate that compositions comprising high fill levels, having large amounts of filler, may have significantly higher hardness values and lower elongation values than the corresponding unfilled gel. Due to differences in densities of the particulate filler and the gel, the particulate filler may constitute up to 90 wt % of the total composition. For example, 60 vol. % of aluminum oxide in a gel of the present invention constitutes about 85 wt %. Preferred gel thermal conductivities are greater than about 0.50 W/m-°K and more preferably greater than about 0.75 W/m-°K.

This invention relates in part to thermosetting gels made by crosslinking MA-EPDM with multifunctional amines in the presence of an extending fluid. MA-EPDM preferably has a functionality greater than 1 and preferably 2.1 to 12 and most preferably 3 to 9. The maleic anhydride units react readily with multifunctional amines to form a crosslinked network. While diamines and triamines are preferred, any multifunctional amine, such as a tetraamine, can also be used, along with combinations of multifunctional amines. The amines react, without any need for a catalyst, with anhydrides to form imide linkages via an intermediate an amic acid as illustrated below. (R' generically denotes the remainder of the amine molecule.)

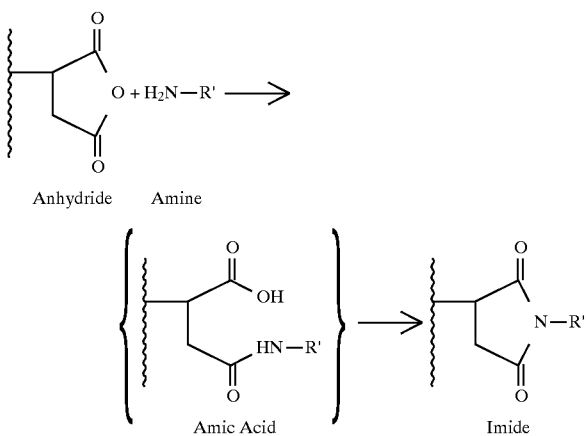

In the above reaction only a single anhydride functionality and a single amine functionality are depicted for the sake of simplicity, but in actuality crosslinking is effected when a multifunctional amine reacts with a polymer having plural anhydride groups, as will be readily understood by those skilled in the art.

A preferred thermoset composition comprises (1) MA-EPDM of from about 10,000 molecular weight to about 500,000 molecular weight and having from about 0.2 to about 5.0 wt % maleic anhydride groups, and (2) an amount of a multifunctional amine effective to react with the anhydride groups on the polymer, the reaction taking place in the presence of an extending fluid which is compatible with the copolymer and sufficiently compatible with diamine to avoid insolubility thereof. Suitable multifunctional amines include 4,4'-diaminodicylohexylmethane (DADCM), 4',4-diamino-3,3'-dimethyldicyclohexylmethane (DMDC), dimer diamine (e.g., Versamine 552), 2-methyl-1,5-diaminopentane (e.g., Dytek A), 4,9-dioxadodecane-1,12-diamine (DDD), 4,7,10-trioxatridecane- 1,13-diamine (TTD), 1-4-bis(3-aminopropyl)-piperazine (BAP), 1,7-diaminoheptane, 1,6-diaminohexane, 1,8-diaminooctane, 1,8-diamino-p-menthane, 4,4'-diaminodiphenyl-methane, 4,4'-diaminodiphenylether, diaminotoluene, 4-aminomethyl-1,8-diaminooctane (TAN, triaminononane), and N,N-bis(3-aminopropyl)methylamine (BPMA).

Thermoset gels prepared with Royaltuf 465 MA-EPDM or Exxelor VA 1803 MA-EP or mixtures thereof in mineral oil and cured with aliphatic diamines and triamines are particularly preferred and display excellent adhesion when cured in contact with a variety of substrates, including polypropylene, nylon-11, poly(phenylene oxide), glass, and aluminum. Where a mixture of MA-EPDM and MA-EP is used, they are preferably combined in a weight ratio of from about 0.1 to about 10, the molecular weight of the MA-EPDM being about 30,000±5,000 and the molecular weight of the MA-EP being about 20,000±2,500.

The physical and mechanical properties of the thermoset gels of this invention can be varied and controlled over a wide range by adjustment of type of polymer, polymer molecular weight, anhydride level, stoichiometry (amine/anhydride ratio), type of amine, extender fluid, and/or polymer content (i.e., dilution level). The EPDM-based gels display good retention of properties when aged at temperatures above the 80° C. limit for SEBS, SB, SEPS and like gels.

The invention also provides a method of making a thermoset gel composition having properties as described above, comprising the step of reacting together (1) a polymer containing anhydride groups; and (2) a multifunctional amine in the presence of an extending fluid. The anhydride-containing polymers has an average of n anhydride groups per molecule where n is greater than 1 and preferably at least 2 or more and most preferably 3 to 10. The second organic compound contains an average of m amine groups per molecule where m is greater than 1 and preferably 2 or more. The sum of n and m is at least 2 and preferably greater than 4. It is preferred for the polymer to have an average molecular weight between anhydride groups of at least 2,500 and preferably at least 10,000.

Mixing and curing of EDPM gels is generally carried out for 2 to 6 hours at 125° to 150° C. Solutions of Royaltuf 465 MA-EPDM are extremely viscous at room temperature and these elevated temperatures are required to achieve a more workable viscosity. The reaction of the multifunctional amine with the MA-EPDM is very fast at these temperatures and the initial formulations gelled within several seconds of mixing. We attempted to prepare gels at lower temperatures and with less reactive amines, hoping to find a temperature/amine combination with a slow cure rate. All the amines tested, however, cured the MA-EPDM-based gel formulations within seconds regardless of the temperature. At the elevated temperatures (100°–170° C.) preferred for mixing and dispensing MA-EPDM-based gels, even the reaction of less nucleophilic aromatic amines with anhydrides is near completion within minutes.

In order to obtain better processability, we developed a method to slow the cure rate, giving longer pot-lives, of close to one hour at 100°–170° C. We first reacted the anhydride with a $C_1$ to $C_{50}$ alcohol, such as 1-dodecanol. Without being bound to theory, we believe that reaction between the anhydride and the alcohol produces an intermediate ester-acid, which is less reactive towards amines than anhydrides. However, at elevated temperatures (60°–200° C.), the ester-acid will react with an amine to form the imide through the intermediate amic acid. Thus, the ester-acid can be thought of as a deactivated anhydride.

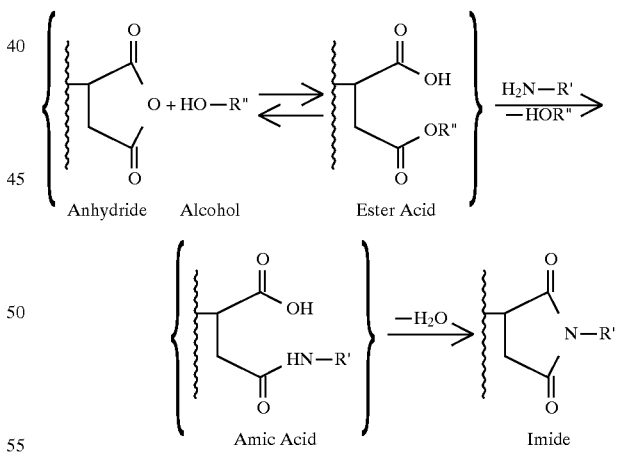

R' and R" denote generically the remainder of the amine and alcohol molecules.

Addition of a diamine to a solution of MA-EPDM in mineral oil containing 1 wt % of 1-dodecanol results in a gel having a pot life of about 30 minutes at 145° C., with a final cure time of about 3 hours. "Pot life," as used herein, is the length of time, at a specified temperature, for which the mixture remains processable for filling operations.

Preferred alcohols are $C_1$ to $C_{50}$ (more preferably $C_8$ to $C_{20}$) aliphatic and/or aromatic alcohols, or mixtures thereof. The alcohols may be linear or branched and may be primary or secondary. Exemplary alcohols include methanol, ethanol, propanol, butanol, pentanol, hexanol, heptanol, octanol, nonanol, decanol, undecanol, dodecanol, tridecanol, tetradecanol, pentadecanol, hexadecanol, heptadecanol, octadecanol, eicosanol, benzyl alcohol, phenylethanol, phenoxyethanol, phenylpropanol, phenylbutanol, phenylpentanol, phenylhexanol, phenylheptanol, phenyloctanol, phenylnonanol, phenyldecanol, phenylundecanol, and phenyldodecanol. Optionally the alcohols may be substituted, for example with halogens, esters, and like moieties.

The extent of branching of the alcohols can affect cure rates. Gels derived from MA-EPDM were prepared using 1.0 wt % of either 1-dodecanol or Jarcol I-16 (2-hexyldecanol) as cure rate inhibitors. Both gels were prepared in mineral oil using 11 wt % Royaltuf 465 MA-EPDM and DMDC as the polymer and amine, respectively. Rheological studies with a Rheometrics Mechanical Spectrometer Model RMS-605 (RMS) at 145° C. indicated that the more sterically hindered Jarcol I-16 gave a faster cure rate.

Alcohol concentration offers an alternative control for the cure rate. About 0.5 wt % or greater alcohol in the mixture generally provides an effective cure rate inhibition.

Mixtures of an ester acid-containing polymer (prepared as described above), a multifunctional amine, and a hydrocarbon extending fluid are stable at room temperature. This allows convenient mixing and processing of uncured gels at room temperature. Such "one-component" gels can subsequently be cured by heating to an elevated temperature, such as 100° to 150° C.

An alternative aspect of the invention is thermoplastic gels based upon polymers having hard and soft blocks. The hard blocks phase separate and produce "physical" crosslinks through interconnected phase-separated domains. Suitable "soft elastomeric blocks" include flexible, soluble polymers EPDM, EP, and the like. Suitable "hard block" segments for the preparation of thermoplastic gels include polyamides (such as nylon-11 and nylon-12), polystyrene, poly(alpha-methyl styrene), polyimide, polyurea, polyester and polymethylmethacrylate. The preferred polymers have hard block molecular weights of from about 5,000 to about 100,000, more preferably about 7,500 to about 75,000, and most preferably about 10,000 to about 50,000. The soft blocks are as recited above. This alternative embodiment also contemplates grafting a polyamide, such as nylon-11, to MA-EPDM in the presence of an extender fluid. The polyamide grafts phase separate from the EPDM-mineral oil phase and act as pseudo crosslinks below the melting transition of the nylon, analogously to other thermoplastic gel systems based on, e.g., SEBS, SEPS, SIS, and the like. Above the melting transition of the nylon, the mixture will be a viscous liquid which can be pumped, extruded, molded or otherwise shaped.

A thermoplastic gel can be made using a block copolymer formed by reaction of the anhydride moieties on the polymer with an amine such as a monoamine-terminated crystalline or glassy polymer. The hard blocks of the block copolymer will phase-separate in the presence of an appropriate extending fluid to form domains. The domains associate to form "physical" crosslinks below the melting point or glass transition temperature of the domains. A preferred amine-terminated crystalline or glassy polymer or oligomer is selected from the group consisting of monoamine-terminated polyundecamide (nylon-11), monoamine-terminated polydodecamide (nylon-12) and monoamine-terminated polystyrene.

A method for preparing thermoplastic gels involves the polymerization of a mixture consisting of an anhydride-containing polymer and an amino acid in hydrocarbon extender fluid. During the polymerization of the amino acid, a fraction of the amino groups react with the anhydride groups, thereby grafting a polyamide onto the original anhydride-containing polymer. The resulting combination of the polyamide-g-EPDM and the hydrocarbon oil extender is a thermoplastic gel of the invention. Suitable amino acids include $C_6$ to $C_{16}$ alpha, omega-amino acids, e.g. 11-aminoundecanoic acid. In other words, the formation of the polyamide and its grafting occurs simultaneously—the polyamide is formed in situ, as it were.

There are at least two alternative synthetic approaches for the thermoplastic gels of the invention. In a second method, mono-amine terminated nylon polymers, or oligomers, are blended with MA-EPDM dissolved in mineral oil to form a graft copolymer.

In a third method, MA-EPDM and an amine-terminated nylon polymer, or oligomer, are melt blended in an extruder to form the nylon-g-EPDM copolymer. Formation of the graft copolymer was followed by extension thereof with a suitable fluid, such as mineral oil, to form the gel. Alternately, a commercially-available nylon-6-g-EPDM, such as Royal-tuf X603 (Uniroyal), can be extended with a suitable extender fluid to provide thermo-plastic gels of the invention.

Some advantages of the nylon-g-EPDM gels over the prior art thermoplastic gel systems are: (1) good high temperature properties (nylon-11 $T_m$=190° C.); (2) lower compression set than other gel systems; and (3) smaller temperature differences between processing temperature and ultimate use temperature.

The following are specific examples and are not intended to limit the scope of the invention.

Thermoset Gel Example 1

A 9 wt % solution of Royaltuf 465 MA-EPDM (maleic anhydride content about 1 wt %) in mineral oil containing 2 wt % 1-dodecanol was prepared by heating a mixture of the components at 160° C. for 18 hr. To a 20 g sample of the EPDM/mineral oil/1-dodecanol solution was added 0.21 g of a 10 wt % solution of DMDC. The mixture was stirred and heated at 160° C. for 2.5 hr. The cured gel had the following properties: Hardness 12–14 g, stress relaxation 60%, and tack 15–20 g.

Thermoset Gel Example 2

A gel was prepared from a terpolymer of ethylene-acrylic ester-maleic anhydride, Lotader 4400 (Orkem Corp.), 10% by wt. in a 9/1 (w/w) mixture of phenylcyclohexane-mineral oil. Assuming the Lotader 4400 had 1.0% by wt. maleic anhydride, 1 equivalent of DMDC (6% by wt. in mineral oil) was added as crosslinker and the gel was cured at 120° C. for 1 hr. For the purposes of the imide-forming reaction, one equivalent is where the ratio of the number of moles of amine divided by the number of moles of anhydride is equal to 1. The gel had the following properties 6 hours after curing: Hardness 475 g, stress relaxation 28%, and tack 8 g.

Thermoset Gel Example 3

An 11 wt % solution of Exxelor VA 1083 (MA-EP) in mineral oil containing 1.0 wt % Jarcol-I-16 2-hexyldecanol, and 1.0 wt % Irganox 1035 (antioxidant from Ciba) was prepared. To a 25 g sample of the solution at 125° C., 1 equivalent of DMDC (6 wt % in mineral oil) was added as crosslinker and the gel was cured at 125° C. for 4 hours. The gel had the following properties 26 hours after curing: Hardness 42.5 g, stress relaxation 33%, and tack 18 g.

Thermoset Gel Example 4

Maleic anhydride was grafted to SBR (Aldrich Chemical, 45 wt % styrene), by first dissolving the SBR in a 9/1 (w/w) mixture of phenylcyclohexane/mineral oil containing 1.5 wt % Irganox 1076 (antioxidant from Ciba) at 120° C. After the SBR dissolved, 2 wt % (based on polymer content) of maleic anhydride was added and the reaction mixture was heated at 190° C. under nitrogen with stirring overnight to complete the reaction. The reaction mixture was allowed to cool to room temperature and about 25 g of it was poured into a glass vial. One equivalent of DMDC (6% by wt. in mineral oil) was added as crosslinker and the solution was cured for 1 hour at 125° C. The gel had the following properties: Hardness 13.4 g, stress relaxation 43%, and tack 6.8 g.

Thermoset Gel Example 5

A series of gels was prepared using NONDTM ester plasticizer as a component in the extending fluid. Thermoset gels were prepared with 11 wt % Royaltuf 465 MA-EPDM, 20 wt % NONDTM, 66.5 wt % mineral oil, 1 wt % Jarcol I-16 branched alcohol, 1.5 wt % Irganox B900 antioxidant, and cured with DMDC at 145° C. for 4 hours at varying stoichiometric levels. Compared to gels prepared without NONDTM, addition of NONDTM to the formulation did not significantly change the gel properties. Table I below lists the properties of the gels prepared using NONDTM.

TABLE I

Properties of 11% EPDM Gels Containing 20% NONDTM

| Stoichiometry (Amine/Anhydride) | Hardness (g) | Tack (g) | Stress Relaxation (%) |
|---|---|---|---|
| 1.28 | 44.0 | 14.9 | 41.1 |
| 1.0 | 44.2 | 19.5 | 37.9 |
| 0.80 | 40.2 | 29.6 | 38.4 |
| 0.70 | 35.5 | 39.6 | 40.6 |
| 0.60 | 30.0 | 41.4 | 42.3 |

Thermoset Gel Example 6

A two-component EPDM gel system designed for use with a static mixing system was developed. Part A contains 12 wt % Royaltuf 465 MA- EPDM and 1 wt % 1 -dodecanol in mineral oil while part B contained 12 wt % Royalene 306 EPDM and a diamine. (The function of the Royalene 306 is to increase the viscosity of part B, thus leading to more efficient mixing when parts A and B are combined in a static mixer.) The formulation is a 90/10 ratio of part A to part B to yield a gel with 10.8 wt % Royaltuf 465, 1.2 wt % Royalene 306, and a stoichiometric ratio of 0.75 amine to maleic anhydride. The gel was cured for 4 hours at 145° C. after mixing. The Voland properties of gels made with Versamine 552 in part B are: 12 g hardness, 35 g tack, and 75% stress relaxation. Gels made with DMDC in part B have 24 g hardness, 25 g tack, and 62% stress relaxation.

Thermoset Gel Example 7

A gel was prepared using a mixture containing of maleic anhydride-containing polymers. First, we prepared a solution of 5.5 wt % Exxelor VA 1083 MA-EP and 5.5 wt % Royaltuf 465 MA-EPDM in mineral oil containing 1.0 wt % Jarcol I-18E (a branched alcohol from Jarchem), 1.0 wt % Irganox 1035, and 1 wt % Irganox B900 antioxidant. To a 25 g sample of the mixture solution at 125° C., 0.75 equivalent of DMDC (6 wt % in mineral oil) was added as crosslinker and the gel was cured at 145° C. for 6 hr. The gel had the following properties 26 hours after curing: Hardness 42.9 g, stress relaxation 38%, and tack 27 g. The same sample was then heat aged for 11 days at 145° C. in an air oven. The gel had the following properties 18 hr after being removed from the oven: Hardness 33 g, stress relaxation 30%, and tack 29 g.

Thermoset Gel Example 8

Another gel was prepared using a mixture of maleic anhydride-containing polymers, Exxelor VA 1083 (Exxon Chemicals), Royaltuf 465 (Uniroyal), and Fusabond MF-280D MA-EPDM (Dupont). We first prepared a solution of 8.0 wt % Exxelor VA 1083, 2.7 wt % Royaltuf 465, and 3.5 wt % Fusabond MF-280D in mineral oil containing 1.0 wt % Jarcol I-18E, 1.0 wt % Irganox 1035, 0.5 wt % Weston DPDP phosphite stabilizer and 0.5 wt % Cyanox 711 (American Cyanamid). To a 25 g sample of the solution at 125° C., 1.0 equivalent of DMDC (12 wt % in mineral oil) was added as crosslinker and the gel was cured at 125° C. for 3 hours. The resulting gel had the following properties 26 hours after curing: Hardness 68.5 g, stress relaxation 27%, and tack 16 g. The sample was heat aged at 145° C. in an air circulating oven for 10 days at 145° C. The aged gel had the following properties: Hardness 65.7 g, stress relaxation 28%, and tack 16.6 g.

Thermoset Gel Example 9

Using the general procedures for preparing thermoset gels described above, 7 diamines were used in the preparation of thermoset gels. The seven diamines were: DDD, BAP, dimer diamine, DADCM, DMDC, DPMA, and Dytek A. Curing of the thermoset gels was generally carried out for 4 to 6 hours at 140°–150° C. using 1-dodecanol as cure rate inhibitor.

Table II gives the Voland properties (hardness, tack, and stress relaxation) of gels made with 12 wt % Royaltuf 465 MA-EPDM at an amine/anhydride ratio of 0.75 and cured for 6 hours at 145° C.

TABLE II

Properties of Gels Prepared With 12% Royaltuf 465 MA-EPDM

| Diamine | Hardness (g) | Tack (g) | Stress Relaxation (%) |
|---|---|---|---|
| Versamine 552 | 22.2 | 55.6 | 59.0 |
| DMDC | 47.9 | 38.0 | 40.1 |
| DDD | 24.7 | 64.1 | 55.1 |

Table III gives the Voland properties of gels prepared with 11 wt % Royaltuf 465 MA-EPDM at an amine/anhydride ratio of 0.75 and cured for 2.5 hours at 145° C.

TABLE III

Properties of Gels Prepared With 11% Royaltuf 465 MA-EPDM

| Diamine | Hardness (g) | Tack (g) | Stress Relaxation (%) |
|---|---|---|---|
| DMDC | 31.1 | 21.6 | 46.4 |
| BAP | 32.1 | 38.0 | 36.3 |

TABLE III-continued

Properties of Gels Prepared With 11% Royaltuf 465 MA-EPDM

| Diamine | Hardness (g) | Tack (g) | Stress Relaxation (%) |
|---|---|---|---|
| Dytek A | 19.2 | 51.1 | 60.1 |
| Versamine 552/DMDC[a] | 24.7 | 64.1 | 55.1 |

[a]1:1 molar mixture

Table IV gives the Voland properties of gels made with 10 wt % Royaltuf 465 MA-EPDM at an amine/anhydride ratio of 0.75 and cured for 4 hours at 145° C.

TABLE IV

Properties of Gels Prepared With 10% Royaltuf 465 MA-EPDM

| Diamine | Hardness (g) | Tack (g) | Stress Relaxation (%) |
|---|---|---|---|
| BAP | 14.9 | 56.5 | 55.3 |
| DMDC | 27.2 | 25.1 | 47.1 |
| DDD | 12.8 | 32.7 | 58.1 |

The hardness was relatively insensitive to the stoichiometric ratio of amine to anhydride. Gels prepared with Versamine 552 and 12 wt % Royaltuf 465 in mineral oil at amine/anhydride ratios of 0.75, 1.0, and 1.25 displayed Voland hardness values of 22.2 g, 20.1 g, and 17.2 g, respectively. The gels prepared with DMDC and 12 wt % Royaltuf 465 in mineral oil at amine/anhydride ratios of 0.75, 1.0, and 1.25, displayed hardness values of 47.9 g, 49.7 g, and 45.6 g, respectively.

Thermoset Gel Example 10

This example describes a one-component thermoset gel system. The gel was prepared by mixing a solution of a maleic anhydride modified polymer (Part A) with an amine curative solution (Part B) in a C.W. Brabender Type DR-2051 Plasti-Corder mixer at 35° C. Part A contains sufficient alcohol so that the anhydride moieties of the maleic anhydride modified polymer are converted to the acid ester form. Reaction of the amine curative with the acid ester takes place primarily at elevated temperatures (above 60° C). Therefore, mixing Part A and Part B at temperatures below 60° C. does not cause significant crosslinking to take place and a stable one-part, thermally curable formulation can be prepared.

Part A was prepared by mixing a solution of 12 wt % Royaltuf 465 MA-EPDM, 1 wt % Irganox 1076 antioxidant, and 1 wt % 1-dodecanol in Witco 380 P.O. oil at 140 ° C. for 7 hr under nitrogen, followed by cooling to room temperature. Part B was prepared by mixing a solution of 12 wt % Royalene 306 polymer, 1 wt % Irganox 1076 antioxidant, and 1 wt % 1-dodecanol in Witco 380 P.O. oil at 140° C. for 7 hr under nitrogen, followed by cooling to room temperature. After the Part B solution had cooled, enough DMDC was added and stirred to yield a solution containing 1 wt % DMDC. (The 1-dodecanol in Part B helps solubilize the DMDC.) A mixture was prepared by combining 345.9 g of Part A and 39 g of Part B in a Plasti-Corder mixer at 35° C. A 20 g sample was placed in a 60 mL vial and cured for 5 hr at 145° C. The Voland properties of the cured gel were: Hardness 25.9 g, tack 48.7 g, and stress relaxation 54.6%. The remaining material was kept at room temperature for 52 days and a second 20 g sample therefrom was placed in a 60 mL vial and cured for 5 hr at 145° C. The Voland properties of the cured gel were: hardness 24.1 g, tack 27.7 g, and stress relaxation 55.5%.

Thermoset Gel Example 11

This example describes a thermoset gel prepared using poly(alpha-olefin) extending fluid, with Exxelor VA 1083 MA-EP and Royaltuf 465 MA-EPDM as the anhydride-containing polymers. This gel was prepared by mixing two solutions, A and B, prepared as follows. Solution A consisted of 6.0 wt % Exxelor VA 1083, 6.0 wt % Royaltuf 465, 1.0 wt % Jarcol I-18T branched alcohol, 1.0 wt % Irganox 1076 antioxidant, and 1.0 wt % Irgafos 168 (antioxidant from Ciba) in Durasyn 174 (a poly(alpha-olefin) fluid from Albemarle). Solution B consisted of 6.1 wt. % solution of DDD in a 10:1 (by wt.) mixture of Hydrobrite 380 mineral oil (Amoco) and Jarcol I-18T alcohol (to help solubilize the DDD). To 25 gram of solution A, at 125° C., was added 0.34 grams of B. The resulting mixture was mixed for about 1 min using a vortex mixer, and then cured at 125° C. for 6 hours. The gel had the following Voland properties 26 hours after curing: Hardness 25 g, stress relaxation 45%, and tack 10 g.

Thermoset Gel Example 12

This example describes a thermoset gel containing two extending fluids. A Solution A was prepared by mixing 11 g Exxelor VA 1083 MA-EP, 11 g Royaltuf 465 MA-EPDM, 1.0 g Jarcol I-18T alcohol, 2.0 g Irganox 1076 antioxidant, 2.0 g Irgafos 168 antioxidant, 74 g American Industrial Oil 320 (Amoco), and 100 g Durasyn 174 poly(alpha-olefin) for 24 hr at 150° C. under nitrogen with stirring. A Solution B consisting of a 5.2 wt % solution of DDD in a 10:1 (by wt.) mixture of Hydrobrite 380 mineral oil and Jarcol I-18T alcohol was also prepared. To a 25 g sample of solution A at 125° C. was added 0.40 g of solution B. The solutions were mixed for about 1 min using a vortex mixer, and then cured at 125° C. for 8 hr. The cured gel had the following Voland properties 26 hr after curing: Hardness 26 g, stress relaxation 40%, and tack 58 g.

Thermoset Gel Example 13

This example illustrates a thermoset gel cured with a mixture of a difunctional and a trifunctional amine. Solution A was prepared by mixing 33 g Exxelor VA 1083 MA-EP, 1.5 g Jarcol I-18T alcohol, 3.0 g Irganox 1076 antioxidant, 3.0 g Irgafos 168 antioxidant, and 260 g American Industrial Oil 320 for 9 hr at 150° C. under nitrogen with stirring. Solution B was prepared, consisting of 3.4 wt % of DDD, 1.0 wt % of TAN (Monsanto), and 5.0 wt. % of Jarcol I-16 alcohol in Hydrobrite 380 mineral oil. To a 25 g sample of solution A at 125° C. was added 0.31 gram of solution B. The solution was mixed for about 1 min with a vortex mixer, and then cured at 125° C. for 5 hr. The cured gel had the following Voland properties 26 hr after curing: Hardness 24 g, stress relaxation 54%, and tack 21 g.

Thermoset Gel Example 14

This example describes a thermoset gel cured using a trifunctional amine. Solution A was prepared by mixing 33 g Exxelor VA 1083 MA-EP, 1.5 g Jarcol I-18T alcohol, 3.0 g Irganox 1076 antioxidant, 3.0 g Irgafos 168 antioxidant, and 260 g American Industrial Oil 680 (Amoco) for 9 hours at 150° C. under nitrogen with stirring. Solution B was prepared consisting of 1.5 wt % of TAN and 3.0 wt. % of Jarcol I-16 alcohol in Hydrobrite 380 mineral oil. To a 25 g sample of solution A at 125° C. was added 0.62 g of solution B. The resulting solution was mixed for about 1 min using a vortex mixer, and then cured at 145° C. for 2.5 hours. The cured gel had the following Voland properties 26 hr after curing: Hardness 36 g, stress relaxation 40%, and tack 13 g.

Thermoset Gel Example 15

This example describes a thermally conductive thermoset gel containing 75 wt % (40 vol %) calcined alumina having 325 mesh particle size (40 microns). Part A solution, consisting of 6.0 wt % Exxelor VA MA-EP, 6.0 wt % Royaltuf 465 MA-EPDM, 1.0 wt % Jarcol I-18E alcohol, 1.2 wt % Irganox 1076 antioxidant, and 0.80 wt % Irgafos 168 antioxidant in Hydrobrite 380 mineral oil was prepared by mixing the components at 145° C. for 8 hr under nitrogen with stirring. Part B was prepared as a solution of 0.58 wt % DMDC and 1.0 wt % Irganox 1076 antioxidant in Hydrobrite 380 mineral oil.

The alumina-filled gel was prepared by mixing 114.67 g of Part A, 400 g of C-75 Fine grade alumina (99.8% purity, Alcan Ingot and Powders) in a 350 cm$^3$ Brabender bowl equipped with cam blades (30 rpm and 35° C.) for about 10 min to blend in the filler. Then 18.66 g of Part B was added, and the mixture was mixed for an additional hr.

A slab of the thermally conductive gel was prepared by compression molding in a 6"×6"×⅛ aluminum frame. The alumina-filled gel was spread into the frame by hand at room temperature. A silicone impregnated cloth served as a release layer on both sides of the gel slab. The uncured composition was then placed in a 60° C. convection oven for 20 minutes to allow the material to distribute throughout the frame. Final cure was carried out under compression in a hot press at 125° C. over 5 hr. The thermally conductive gel slab, evaluated as a stack of slabs, displayed a Voland hardness of 266 g, Voland stress relaxation of 54%, and a Voland tack of 43 g.

The thermal conductivity of the gel was measured by a guarded heat flow meter, Model 2021 made by Anter Corporation, in accordance with ASTM E1530. A 2" diameter gel disc was held within a hollow cylindrical PTFE spacer sandwiched between two brass cover plates. A thermally conductive grease (Type 44 Heat Sink Compound, G. C. Electronics, Rockford, Ill.) was applied between the surface of the thermally conductive gel and the brass cover plates to reduce interfacial resistance. The thermal conductivity was measured at 70° C. under a 10 psi normal load on the test stack. The thermal conductivity of the alumina filled gel was 0.62 W/m-°K.

Thermoset Gel Example 16

This example describes the preparation of a thermoset gel with polybutene oil as the extending fluid. A Part A solution was prepared by mixing 22 g Exxelor VA 1083 MA-EP, 1.0 g Jarcol I-18T branched alcohol, 2.0 g Irganox 1035 antioxidant, 2.0 g Irgafos 168 antioxidant, and 273 g of Indopol H-25 polybutene (Amoco) at 145° C. for 8 hours under nitrogen with stirring. A Part B solution was prepared by mixing together 6.25 g of Hydrobrite 380 P.O. mineral oil, 0.2 g DDD, 0.12 g triaminononane, and 0.35 g Jarcol I-16 alcohol. A 25 gram sample of the Part A solution at 125° C. and a 0.28 g sample of Part B were mixed with a vortex mixer for about 1 min. The mixture was cured at 125° C. for 6 hours. The gel had the following Voland properties 26 hours after curing: Hardness 30.4 g, stress relaxation 57%, and tack 54 g. The same sample was then heat aged for 5 days at 155° C. in an air oven. The gel had the following Voland properties 18 hours after being removed from the aging oven: Hardness 34 g, stress relaxation 53%, and tack 86 g.

Thermoplastic Gel Example 1

A thermoplastic gel based on nylon 12-g-EPDM was prepared in the following manner: 200 g of a 12 wt % solution of Dupont Fusabond MF-227D (1.7% maleic anhydride) EPDM in mineral oil containing 1 wt % Irganox 1076 antioxidant was prepared by heating a mixture of the components to 140° C. for 4 hours under nitrogen. The temperature was then raised to 200° C. and 8 g of 12-aminododoecanoic acid was added over 2 min. Polymerization of the 12-aminododecanoic acid was noted by a slight foaming of the mixture indicating evolution of water vapor due to amide formation. After about 20 min the foaming stopped and the viscosity began to increase. The mixture was heated for an additional 15 min, degassed under vacuum, then removed from heating and allowed to cool to room temperature. The (nylon 12)-g-EPDM gel was compression molded at 250° C. to yield a slab about 0.25 inch thick. The Voland properties were measured by cutting a portion of the slab into 4 one inch by one inch sections. The sections were stacked on top of another and the Steven-Voland properties were measured in the usual manner to yield the following results: Hardness: 43 g, tack 1 g, and stress relaxation 1.7%.

Type D dogbone specimens were also cut from the slab for mechanical property characterization according to ASTM D-638. The (nylon-12)-g-EPDM displayed the following properties: Tensile strength 6.5 psi, elongation 247%, and toughness 16.0 in-lb/in$^3$.

Thermoplastic Gel Example 2

This example describes the preparation of a thermoplastic gel based on (nylon-11)-g-EPDM. 200 g of 10 wt % solution of Dupont Fusabond MF-337D (1.7 wt % maleic anhydride) in mineral oil containing 1 wt % Irganox 1076 antioxidant was prepared by heating a mixture of the components to 140° C. for 5 hr under nitrogen. The temperature was then raised to 200° C. and 9 g of 11-aminododecanoic acid were added. Polymerization of the 11-aminododecanoic acid was noted by a slight foaming of the mixture indicating evolution of water vapor due to amide formation. After about 20 min, the foaming stopped and the viscosity began to increase. The mixture was heated for an additional 10 min, and degassed under vacuum. An approximately 6 g portion of the (nylon 11)-g EPDM gel was poured while still hot into a 60 mL vial and allowed to cool to room temperature. The remaining material was removed from heating and allowed to cool to room temperature.

The cured gel had the following Steven-Voland measured properties when measured in the 60 mL vial: Hardness 20 g, tack 2.5 g, and stress relaxation 20%

Thermoplastic Gel Example 3

A thermoplastic gel based on nylon-11 grafted to a mixture of MA-EPDM and MA-EP was prepared in the following manner: 200 grams of a mixture of 8 wt % solution of Dupont Fusabond MF-227D (1.7 wt % maleic anhydride) and 3 wt % Exxon Exxelor VA-1803 (0.7 wt % maleic anhydride) in mineral oil containing 1 wt % Irganox 1076 (antioxidant) was prepared by heating a mixture of the components to 140° C. for 5 hr under nitrogen. The temperature was then raised to 200° C. and 8 g of 11-aminododecanoic acid was added over 2 min. Polymerization of the 11-aminododecanoic acid was noted by a slight foaming of the mixture indicating evolution of water vapor due to amide formation. After about 20 min the foaming stopped and the viscosity began to increase. The gel was heated for an additional 15 min, and then degassed under vacuum. Approximately 25 g of the gel was poured, while still hot, into a 60 mL vial and allowed to cool to room temperature. The cured gel had the following Voland properties when measured in the 60 mL vial: Hardness 21 grams, tack 2.5 g, and stress relaxation 20%.

Thermoplastic Gel Example 4

A solution of 33 g of Exxelor VA 1803 MA-EP and 3 g of Irganox 1076 antioxidant in 264 grams of Witco 360A mineral oil was heated to 195° C. under nitrogen with stirring. Twelve g of 11-aminododecanoic acid were added and after about 2 min. the mineral oil solution began to foam due to the evolution of water resulting from the polymerization to form nylon-11 and from reaction of amino groups with anhydride present in the Exxlor VA 1803 to form nylon-11 grafts. After an additional 8 min., the mixture was subjected to vacuum for an additional 20 min. to remove the water formed during the reaction. The viscosity of the resulting (nylon 11)-grafted ethylene-propylene rubber ((nylon 11 )-g-EP) appeared greater than that of the starting Exxelor VA 1803 solution. After a total reaction time of 30 min, samples of the gel were poured into vials and allowed to stand at room temperature for 5 days. The resulting gel had the following Voland properties: Hardness 6.9 g, stress relaxation 69%, and tack 19.7 g.

Comparative Examples

The purpose of this experimental work was to compare the aging behavior of gels of the present invention, in particular a thermoset gel produced from an anhydride-modified EPDM, with that of a polyurethane gel as taught in U.S. Pat. No. 4,634,207. The gel thermal aging studies were done in a forced air oven at 125° C.

Anhydride-modified MA-EP gels were made from Exxelor VA 1803 in a mineral oil extending fluid and was cured with the aliphatic diamine, DMDC at amine to anhydride ratios of 0.60 and 0.85 and were compared to polyurethane gels of the type used in the Termseal® product from Raychem Corporation.

Samples of the polyurethane gels and the thermoset gels of the invention were aged at 125° C. for three weeks. The samples were periodically removed from the oven and allowed to stand at room temperature. After 6 hr, the Voland properties of gels were measured. After measurements were recorded, the samples were returned to the oven.

After three weeks at 125° C., the polyurethane gel samples displayed severe surface oxidation and had a tough skin of crosslinked polymer of about 5 mm thickness. Under this "skin," the material had turned to liquid indicating degradation of the polyurethane network. Hardness increased from 33.0 g to 57.0 g, stress relaxation increased from 21% to 27%, and tack decreased from 18 g to 0 g.

The thermoset gels of the invention, however, still exhibited Voland properties within the useful application range after three weeks at 125° C. No visible surface degradation, fluid loss, or liquefaction was observed. Thus, the gels of this invention exhibit improved heat aging performance compared to that of the Termseal® polyurethane gels and are thus suitable use of higher temperatures than polyurethane gels. Results are summarized in Table V.

|  | Exxelor VA-1803 Based Gels | | Polyurethane Gel |
| --- | --- | --- | --- |
| Amine/Anhydride stoichiometric ratio | 0.60 | 0.85 | n/a |
| Initial properties | | | |
| Voland hardness (b) | 31 | 38 | 33 |
| Voland tack (g) | 17 | 27 | 18 |
| Voland stress relaxation (g) | 45 | 43 | 21 |
| Properties after 3 weeks at 125° C. | | | |
| Voland hardness (b) | 32 | 51 | 57 |
| Voland tack (g) | 37 | 43 | 0 |
| Voland stress relaxation (g) | 43 | 33 | 27 |

Although the invention has been described with respect to preferred embodiments, these are intended to be illustrative and not limiting. Many embodiments will be apparent to those of skill in the art upon reviewing the preceding description. Thus the invention should be determined in accordance with the description, claims and full scope of equivalents obvious to the ordinarily skilled artisan.

What is claimed is:

1. A method of making a composition comprising a gel having a Voland hardness between 2 and 500 g, a stress relaxation of less than 85%, an elongation greater than 50%, and a tack greater than 2 g and comprising between about 3 and about 45% by weight of an anhydride-containing polymer having from about 0.01 wt % to about 10 wt % of anhydride groups, based on the weight of said anhydride containing polymer, and between about 97 and about 55% by weight of an extending fluid, the %'s by weight of said anhydride-containing polymer and extending fluid being based on the combined amounts of said anhydride-containing polymer and said extending fluid; said method comprising reacting the anhydride moieties in said anhydride-containing polymer with an alcohol to form ester-acid moieties and then reacting said ester-acid moieties with a multifunctional amine to form imide linkages, wherein said alcohol is selected from the group consisting of methanol, ethanol, propanol, butanol, pentanol, hexanol, heptanol, octanol, nonanol, decanol, undecanol, dodecanol, tridecanol, tetradecanol, pentadecanol, hexadecanol, heptadecanol, octadecanol, eicosanol, benzvl alcohol, phenylethanol, phenoxyethanol, phenylpropanol, phenylbutanol, phenylpentanol, phenylhexanol, phenylheptanol, phenyloctanol, phenylnonanol, phenyldecanol, phenylundecanol, phenyldodecanol, and mixtures thereof.

2. A method according to claim 1, wherein said multifunctional amine is selected from the group consisting of 4,4'-diaminodicyclohexylmethane, 4,4'-diamino-3,3'-dimethyldicyclohexylmethane, dimer diamine, 2-methyl-1, 5-diaminopentane, 4,9-dioxadodecane-1,12-diamine, 4,7, 10-trioxatridecane-1,13-diamine, 1,4-bis(3-aminopropyl)-piperazine, 1,7-diaminoheptane, 1,6-diaminohexane, 1,8-diaminooctane, 1,8-diamino-p-menthane, 4,4'-diaminodiphenylmethane, 4,4'-diaminodiphenylether, diaminotoluene, 4-aminomethyl-1,8-diaminooctane, and N,N-bis(3-aminopropyl)methylamine.

3. A method according to claim 2, wherein said alcohol is selected from the group consisting of methanol, ethanol, propanol, butanol, pentanol, hexanol, heptanol, octanol, nonanol, decanol, undecanol, dodecanol, tridecanol, tetradecanol, pentadecanol, hexadecanol, heptadecanol, octadecanol, eicosanol, benzyl alcohol, phenylethanol, phenoxyethanol, phenylpropanol, phenylbutanol, phenylpentanol, phenylhexanol, phenylheptanol, phenyloctanol, phenylnonanol, phenyldecanol, phenylundecanol, phenyldodecanol, and mixtures thereof.

4. A method according to claim 1, wherein said anhydride-containing polymer is a copolymer or graft copolymer of maleic anhydride and one or more of the following monomers: ethylene, propylene, styrene, butene, butadiene, isobutylene, isoprene, acrylonitrile, 1-pentene, 1-hexene, 4-methyl-1-pentene, 1,3-pentadiene, dicyclopentadiene, 2-methylene-5-norbornene, linear or branched $C_1$ to $C_{10}$ alkyl vinyl ethers, linear or branched $C_1$ to $C_{10}$ alkyl substituted acrylates or methacrylates.

5. A method according to claim 1, wherein said anhydride-containing polymer is selected from the group consisting of maleic anhydride-modified-ethylene propylene diene monomer copolymer (MA-EPDM), maleic anhydride-modified-ethylene propylene copolymer (MA-EP), maleic anhydride-modified-styrene butadiene rubber (MA-SBR), maleic anhydride-modified-acrylonitrile butadiene rubber, and mixtures thereof.

6. A method according to claim 5, wherein said anhydride-containing polymer is a mixture of MA-EPDM and MA-EP in a weight ratio of from about 0.1 to about 10.

7. A method according to claim 5, wherein said alcohol is selected from the group consisting of methanol, ethanol, propanol, butanol, pentanol, hexanol, heptanol, octanol, nonanol, decanol, undecanol, dodecanol, tridecanol, tetradecanol, pentadecanol, hexadecanol, heptadecanol, octadecanol, eicosanol, benzyl alcohol, phenylethanol, phenoxyethanol, phenylpropanol, phenylbutanol, phenylpentanol, phenylhexanol, phenylheptanol, phenyloctanol, phenylnonanol, phenyldecanol, phenylundecanol, phenyldodecanol, and mixtures thereof.

8. A method according to claim 5, wherein said multi-functional amine is selected from the group consisting of 4,4'-diaminodicyclohexylmethane, 4,4'-diamino-3,3'-dimethyldicyclohexylmethane, dimer diamine, 2-methyl-1,5-diaminopentane, 4,9-dioxadodecane-1,12-diamine, 4,7,10-trioxatridecane-1,13-diamine, 1,4-bis(3-aminopropyl)-piperazine, 1,7-diaminoheptane, 1,6-diaminohexane, 1,8-diaminooctane, 1,8-diamino-p-menthane, 4,4'-diaminodiphenylmethane, 4,4'-diaminodiphenylether, diaminotoluene, 4-aminomethyl-1,8-diaminooctane, and N,N-bis(3-aminopropyl)methylamine.

9. A method according to claim 1, wherein said extending fluid is selected from the group consisting of mineral oil, polybutene oil, polypropylene oil, liquid EPDM, liquid polybutadiene, poly(alpha-olefins), linear or branched $C_1$ to $C_{18}$ dialkyl esters of phthalic, isophthalic, or terephthalic acid, and linear or branched $C_1$ to $C_{18}$ trialkyl esters of trimellitic acid.

10. A method according to claim 1, further comprising the step of adding up to about 65% by volume of a thermally conductive filler having a thermal conductivity greater than about 1 W/m-°K.

* * * * *